United States Patent
Kanto et al.

[11] Patent Number: 5,993,990
[45] Date of Patent: Nov. 30, 1999

[54] PTC CURRENT LIMITING HEADER ASSEMBLY

[75] Inventors: Eric V. Kanto, Tucson, Ariz.; Donald C. Cubbison, Hickory, N.C.

[73] Assignee: Moltech Corporation, Tucson, Ariz.

[21] Appl. No.: 09/079,995

[22] Filed: May 15, 1998

[51] Int. Cl.$^6$ ............................. H01M 2/00; H01M 10/50
[52] U.S. Cl. ............................. 429/62; 429/61; 429/59; 429/7
[58] Field of Search ................... 429/7, 61, 62, 429/59

[56] References Cited

U.S. PATENT DOCUMENTS

| | | |
|---|---|---|
| 3,823,217 | 7/1974 | Kampe . |
| 3,861,029 | 1/1975 | Smith-Johannsen et al. . |
| 4,053,687 | 10/1977 | Coibion et al. ............................. 429/94 |
| 4,053,692 | 10/1977 | Dey ......................................... 429/171 |
| 4,158,721 | 6/1979 | Decker et al. ............................. 429/174 |
| 4,177,376 | 12/1979 | Horsma et al. ........................... 219/553 |
| 4,188,276 | 2/1980 | Lyons et al. ........................... 204/159.17 |
| 4,237,441 | 12/1980 | van Konynenburg et al. ....... 338/22 R |
| 4,238,812 | 12/1980 | Middleman et al. .................... 361/106 |
| 4,255,698 | 3/1981 | Simon ......................................... 320/35 |
| 4,304,987 | 12/1981 | van Konynenburg .................. 219/553 |
| 4,329,726 | 5/1982 | Middleman et al. ...................... 361/58 |
| 4,330,703 | 5/1982 | Horsma et al. ........................... 219/553 |
| 4,358,514 | 11/1982 | Garoutte et al. .......................... 429/181 |
| 4,388,607 | 6/1983 | Toy et al. ............................. 338/22 SD |
| 4,426,633 | 1/1984 | Taylor ......................................... 338/25 |
| 4,445,920 | 5/1984 | Smith . |
| 4,514,620 | 4/1985 | Cheng et al. . |
| 4,534,889 | 8/1985 | van Konynenburg et al. . |
| 4,543,474 | 9/1985 | Horsma et al. . |
| 4,560,498 | 12/1985 | Horsma et al. . |
| 4,591,700 | 5/1986 | Sopory . |
| 4,603,165 | 7/1986 | McDonald et al. . |
| 4,654,511 | 3/1987 | Horsma et al. . |
| 4,707,424 | 11/1987 | Bowsky et al. ........................... 429/181 |
| 4,792,503 | 12/1988 | Eppley ..................................... 429/181 |
| 4,855,195 | 8/1989 | Georgopoulos et al. ................. 429/54 |
| 4,922,242 | 5/1990 | Parker . |
| 4,966,822 | 10/1990 | Johnston .................................... 429/62 |
| 4,971,867 | 11/1990 | Watanabe et al. ......................... 429/61 |
| 5,008,161 | 4/1991 | Johnston ...................................... 429/7 |
| 5,376,467 | 12/1994 | Abe et al. ...................................... 429/7 |
| 5,422,201 | 6/1995 | Georgopoulos ......................... 429/170 |
| 5,567,539 | 10/1996 | Takahashi et al. ......................... 429/57 |
| 5,602,520 | 2/1997 | Baiatu et al. ......................... 338/22 R |
| 5,609,972 | 3/1997 | Kaschmitter et al. .................... 429/56 |
| 5,731,098 | 3/1998 | Suzuki ....................................... 429/53 |
| 5,747,187 | 5/1998 | Byon ......................................... 429/58 |
| 5,876,868 | 3/1999 | Tanida ....................................... 429/56 |

Primary Examiner—Maria Nuzzolillo
Assistant Examiner—Tracy Dove
Attorney, Agent, or Firm—Morrison & Foerster LLP

[57] ABSTRACT

The present invention pertains to current limiting (overcurrent protection) header assemblies which employ a Positive Temperature Coefficient (PTC) device. More particularly, this invention pertains to current limiting header assemblies which employ a PTC device and which have particular design features, specifically, a dimpled support plate and an apertured PTC plate positioned above the dimpled support plate, wherein the dimple protrudes into or through the aperture. The header assemblies are useful in battery cells, particularly in battery cells which employ a glass-to-metal, plastic-to-metal, and similar seal instead of a stacked and crimped design. The header assemblies are compact, effectively taking up only a little more thickness than would be required for just an end cap, permitting the use of more electroactive materials and thereby yielding a battery with increased energy density. The header assemblies also offer increased reliability at the higher temperatures and humidities, which is not offered by the stacked and crimped design.

39 Claims, 4 Drawing Sheets

PTC CURRENT LIMITING HEADER ASSEMBLY

TECHNICAL FIELD

The present invention relates generally to the field of positive temperature coefficient (PTC) devices and electric current producing battery cells comprising PTC devices. More particularly, this invention pertains to current limiting (overcurrent protection) header assemblies which employ a PTC device and which have particular design features, specifically, a dimpled support plate and an apertured PTC plate positioned above the dimpled support plate, wherein the dimple protrudes into or through the aperture. The present invention also relates to methods of incorporating such header assemblies into batteries, and batteries comprising such current limiting header assemblies.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

The term "battery" is generally used to describe a single unit comprising one or more electric current producing cells. The electric current is produced directly by chemical reactions which occur within the battery. The terms "battery," "battery cells," "electric current producing cells," and "cells" are used interchangeably herein.

Current limiting or overcurrent protection devices of various designs which function by limiting current flow have been used for preventing overcurrent conditions from damaging the battery or cell and potentially leading to an unsafe condition. A typical current limiting protection device is a PTC device, where PTC is an abbreviation for "Positive Temperature Coefficient" and refers to the property of the device such that the electrical resistance of the device increases sharply when the PTC device is heated. When utilized for internal temperature protection in batteries, PTC devices function by heating up rapidly when the flow of current in the battery is at a high level and thereby greatly increasing the electrical resistance of the PTC device, which then suppresses or limits the high current flow. Without the PTC device to limit the current, a high current flow in the battery, such as that caused by a short circuit in the battery, would increase the temperature of the battery and may lead to an unsafe condition (e.g., venting, explosion).

Materials and compositions exhibiting PTC behavior, and electrical devices comprising them, are well known. Examples of useful materials compositions and electrical applications are those described in U.S. Pat. No. 3,861,029 to Smith-Johannsen et al.; U.S. Pat. No. 3,823,217 to Kampe; U.S. Pat. No. 4,177,376 to Horsma et al., U.S. Pat. No. 4,188,276 to Lyons et al.; U.S. Pat. No. 4,237,441 to van Konynenburg et al.; U.S. Pat. No. 4,238,812 to Middleman et al.; U.S. Pat. No. 4,255,698 to Simon; U.S. Pat. No. 4,304,987 to van Konynenburg; U.S. Pat. No. 4,329,726 to Middleman et al.; U.S. Pat. No. 4,330,703 to Horsma et al.; U.S. Pat. No. 4,388,607 to Toy et al.; U.S. Pat. No. 4,426,633 to Taylor; U.S. Pat. No. 4,514,620 to Cheng et al.; U.S. Pat. No. 4,534,889 to van Konynenburg et al.; U.S. Pat. No. 4,543,474 to Horsma et al.; U.S. Pat. No. 4,560,498 to Horsma et al.; U.S. Pat. No. 4,591,700 to Sopory; U.S. Pat. No. 4,603,165 to McDonald et al.; U.S. Pat. No. 4,654,511 to Horsma et al.; U.S. Pat. No. 4,922,242 to Parker; U.S. Pat. No. 5,602,520 to Baiatu et al.; and U.S. Pat. No. 5,609,972 to Kaschmitter et al. A typical PTC device is a POLYSWITCH material (a trademark for PTC devices available from Raychem Corporation, Menlo Park, Calif., and as described in the Current Protection Data Book for POLYSWITCH™ Resettable Fuses (February 1997) available from Raychem Corporation, Menlo Park, Calif.).

These overcurrent devices generally use a stacked array of circular stampings consisting of the current limiting protective device, insulators, contacts, support cups, and end caps which are situated at the top of the cells, typically on a crimped bead, and held in place by a crimped-over edge of the can of the cell, and are typically referred to as header assemblies. For example, U.S. Pat. No. 4,971,867 to Watanabe et al. describes a cylindrical organic electrolyte battery with a conventional installation of the PTC device at the top of the cell, and a different installation with the PTC device attached to the bottom of the battery case through a metal plate so that the upper opening of the battery case can be tightly sealed.

There are a variety of crimped seal designs for use in batteries. For example, U.S. Pat. No. 5,422,201 to Georgopoulos describes a seal body and a compression means for a cell with a crimped seal design. U.S. Pat. No. 4,053,687 to Coibion et al. describes an arrangement for the conductive borders of the electrodes for a cell with a crimped seal design. Many crimped seal designs for use in batteries utilize a beaded seal surface on the inside opening of the battery can to locate and position the header prior to crimping. All of the header parts, whether they include PTC current limiting devices or not, are typically inserted and stacked up on this internal beaded surface prior to crimping. Usually several washers, a plastic seal ring, other devices including PTC devices and safety vents, and the positive end cap are inserted into the cell through the top. A crimp is then rolled over onto the stack of devices and plastic seal ring. The formed metal bead of the inside beaded seal surface and the rolled over crimp clamp the stack of parts together. Sealing is obtained by the plastic seal ring being in compression between the rolled over crimp and the beaded seal surface on the inside of the can. The header then becomes the lid of the can after the crimping is performed. FIG. 1 illustrates a typical header assembly of a crimped seal design. The battery comprises a cell can, 101, in which is contained a battery stack, 102, comprising the negative and positive electrodes separated by a separator insulation layer. A tab, 103, connects one of the electrodes to the header assembly, 104. The header assembly comprises sealing plates, 105 and 106, a metal plate, 107, a PTC plate, 108, an end cap, 109, and insulating members, 110 and 111. The header assembly is situated on a crimp bead, 112, and held in place by a crimped-over edge of the can, 113.

The addition of a part, such as the PTC current limiting device, to the header is usually done by the addition or modification of the stack of parts that make up the header assembly. For example, U.S. Pat. Nos. 4,966,822 and 5,008,161 to Johnston describe batteries compatible with a crimped seal design and comprising a thermal disconnect or current limiting assembly between the end cap and a plate to which the terminal pin is attached. U.S. Pat. No. 4,855,195 to Georgopoulos et al. describes a current collector with a PTC device for use with cells with a crimped seal design.

In contrast, glass-to-metal, plastic-to-metal, and related seals for batteries do not commonly employ a PTC current limiting protection device. Glass-to-metal, plastic-to-metal, and similar types of seals for electrochemical cell terminals, particularly for sealing thin terminal pins, are difficult to achieve with complete hermetic sealing, reliable electrical contact, permanent isolation of the positive and negative terminals of the cell, and resistance to fracturing or breaking under conditions of rough usage or cell expansion by reason of shorting. For example, U.S. Pat. No. 4,158,721 to Decker et al. describes the use of a special tack shaped terminal pin of greater contact area to make more reliable glass-to-metal seals for electrochemical cells. U.S. Pat. No. 4,707,424 to Bowsky et al. describes the use of a terminal pin and an eyelet with an aperture for glass-to-metal seals of electrochemical cells. U.S. Pat. No. 4,053,692 to Dey describes a hermetic seal comprising a glass ring sealed to a metal. Also, for example, U.S. Pat. No. 4,358,514 to Garoutte et al. describes a hermetic glass-to-metal seal fabricated using a bonding temperature of at least 1800° F. (982.2° C.). U.S. Pat. No. 4,445,920 to Smith describes a glass-to-metal seal made using a bonding temperature of 1050° C. U.S. Pat. No. 4,792,503 to Eppley describes a hermetic glass-to-metal seal of a stainless steel header to a stainless steel terminal pin.

In order to also incorporate current limiting protective devices, glass-to-metal or similarly sealed cells require a different type of design for the header assembly than are utilized with crimp sealed cells. No shorting of the cell can be allowed even with a failure in the insulating cover of the cell. One requirement for the mechanical design is the attachment of the PTC current limiting device to a current feedthrough pin, typically of small diameter (e.g., 0.062 inches, ~1.6 mm). One limitation on the attachment method is the range of temperatures allowed during the metal-to-metal attachment. Secondly, the connection has to be as electrically conductive as the base metals. Thirdly, the attachment process has to be very repeatable and easily adapted to automation.

The stacked and crimped design for header assemblies incorporating the overcurrent protection device typically requires a significant amount of space in the cell and has reliability limitations for use in batteries at temperatures and humidities at the upper end of the range of normal operating conditions. It would be advantageous to reduce the space required for the header assembly incorporating the overcurrent protection device and to provide a header assembly with a design and method of sealing with increased reliability at the higher temperatures and humidities, which is not offered by the stacked and crimped design. By reducing the space required for the overcurrent protection device and seal design, a battery containing the overcurrent protection header can contain more electroactive materials, thereby yielding a battery with increased energy density.

To increase the reliability at higher temperatures and humidities while also providing an overcurrent protection device utilizing a reduced space, header assemblies with more reliable non-crimped seal designs, such as cells utilizing glass-to-metal, plastic-to-metal, and other related types of terminal pin contact feedthroughs integrated with a current limiting protective device, would be advantageous, but such types of header assemblies for use in batteries have not heretofore been reported.

SUMMARY OF THE INVENTION

One aspect of the present invention pertains to a thermally activated current limiting assembly comprising:

(i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface; and, (ii) a substantially flat apertured PTC plate positioned above said support plate, and on the same side of said support plate as said raised dimple, said PTC plate being in electrical contact with said support plate, said PTC plate having an aperture which is larger than said raised dimple outer diameter and which is large enough to accommodate said raised dimple, which aperture is aligned with said raised dimple, which raised dimple protrudes into or through said aperture.

Another aspect of the present invention pertains to a thermally activated current limiting header assembly for use in a battery, said assembly comprising:

(i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;

(ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate; and, (iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate.

Still another aspect of the present invention pertains to a thermally activated current limiting header assembly for use in a battery, said assembly comprising:

(i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;

(ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate;

(iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate; and, (iv) an electrically conductive end cap having a perimeter and positioned above said first insulating plate and above said PTC plate, said end cap being in electrical contact with said PTC plate, said first insulating plate interposed between said end cap and said support plate.

Yet another aspect of the present invention pertains to a thermally activated current limiting header assembly for use in a battery, said assembly comprising:

(i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;

(ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate;

(iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate.

(iv) an electrically conductive end cap having a perimeter and positioned above said first insulating plate and above said PTC plate, said end cap being in electrical contact with said PTC plate, said first insulating plate interposed between said end cap and said support plate; and, (v) a second substantially flat apertured electrically insulating plate positioned below said support plate, and on the same side of said support plate as said sunken dimple, said second insulating plate having an aperture which is equal to or smaller than said sunken dimple inner diameter and which is aligned with said sunken dimple, said second insulating plate having a perimeter which extends beyond the perimeter of said support plate.

In one embodiment, the inside surface of said sunken dimple is a convex surface. In one embodiment, the raised dimple is a portion of a convoluted spring or bellows feature. In one embodiment, the PTC plate is bonded to said support plate via a first electrically conductive bonding material. In one embodiment, the first electrically conductive bonding material is selected from the group consisting of: metal solders, conductive polymer compositions, and mixtures thereof. In one embodiment, the first electrically conductive bonding material is selected from the group consisting of: tin-based solders, conductive nickel-filled epoxy polymers, and conductive silver-filled epoxy polymers. In one embodiment, the end cap is bonded to said PTC plate via a second electrically conductive bonding material. In one embodiment, the second electrically conductive bonding material is selected from the group consisting of: metal solders, conductive polymer compositions, and mixtures thereof. In one embodiment, the second electrically conductive bonding material is selected from the group consisting of: tin-based solders, conductive nickel-filled epoxy polymers, and conductive silver-filled epoxy polymers. In one embodiment, the end cap has an aperture. In one embodiment, the second insulating plate further comprises a protrusion on the face opposite the face of said second insulating plate which is in contact with said support plate.

Still another aspect of the present invention pertains to a battery comprising (i) a container; (ii) an anode material, a cathode material, and an electrolyte material disposed within said container; (iii) a lid assembly attached to said container, said lid assembly having a metal terminal pin for current feedthrough, said metal terminal pin in electrical contact with said anode material or said cathode material; and, (iv) a thermally activated current limiting assembly as described herein attached to said lid assembly, wherein said metal terminal pin is attached to, and in electrical contact with, the inside surface of said sunken dimple.

A further aspect of the present invention pertains to a method of making a battery comprising (i) providing a container; (ii) providing an anode material, a cathode material and an electrolyte material, and disposing said anode material, cathode material and electrolyte material within said container; (iii) providing a lid assembly and attaching said lid assembly to said container, said lid assembly having a metal terminal pin for current feedthrough, said metal terminal pin in electrical contact with said anode material or said cathode material; and, (iv) providing an assembly according to claim 1 and attaching said assembly to said lid assembly, wherein said metal terminal pin of said lid assembly is attached to, and in electrical contact with, the inside surface of said sunken dimple.

Additional embodiments are described below. As will be appreciated by one of skill in the art, features of one aspect or embodiment of the invention are also applicable to other aspects or embodiments of the invention.

DETAILED DESCRIPTION OF THE INVENTION

The present invention pertains to current limiting (overcurrent protection) header assemblies which employ a Positive Temperature Coefficient (PTC) device. More particularly, this invention pertains to current limiting header assemblies which employ a PTC device and which have particular design features, specifically, a dimpled support plate and an apertured PTC plate positioned above the dimpled support plate, wherein the dimple protrudes into or through the aperture. The header assemblies are useful in battery cells, particularly in battery cells which employ a glass-to-metal, plastic-to-metal, and similar seal instead of a stacked and crimped design. To overcome the problems of incorporating a current limiting protection device into the header assembly utilizing a glass-to-metal or similar type of seal with a current feedthrough pin, typically of a small diameter, a compact and integrated subassembly of the current limiting header assembly of this invention was designed to simplify the header assembly process and to provide repeatable results from cell to cell. To allow the current to pass through the pin, through the PTC device, and then through the end cap in a compact design, a PTC support was designed that allows the PTC header assembly to be made thinner, effectively taking up only a little more thickness than would be required for just an end cap. This permits the use of more electroactive materials and thereby yields a battery with increased energy density. The header assemblies also offer increased reliability at the higher temperatures and humidities, which is not offered by the stacked and crimped design. The present invention also relates to methods of incorporating such a current limiting header assembly into a battery, and batteries comprising such a current limiting header assembly.

Figure 1:
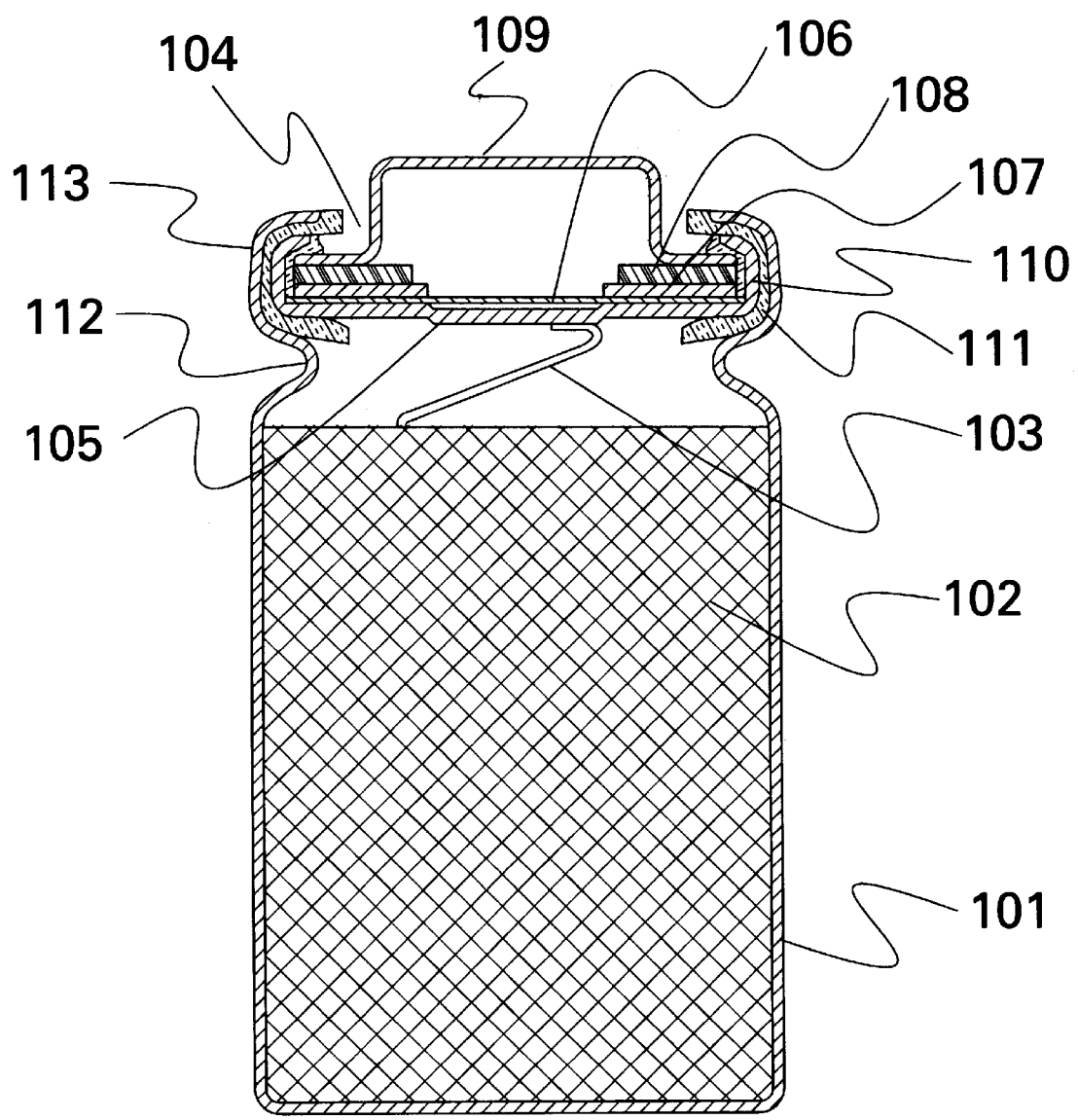
FIG. 1 illustrates a typical cell with a conventional installation of a current limiting header assembly with a crimp seal.
Figure 2:
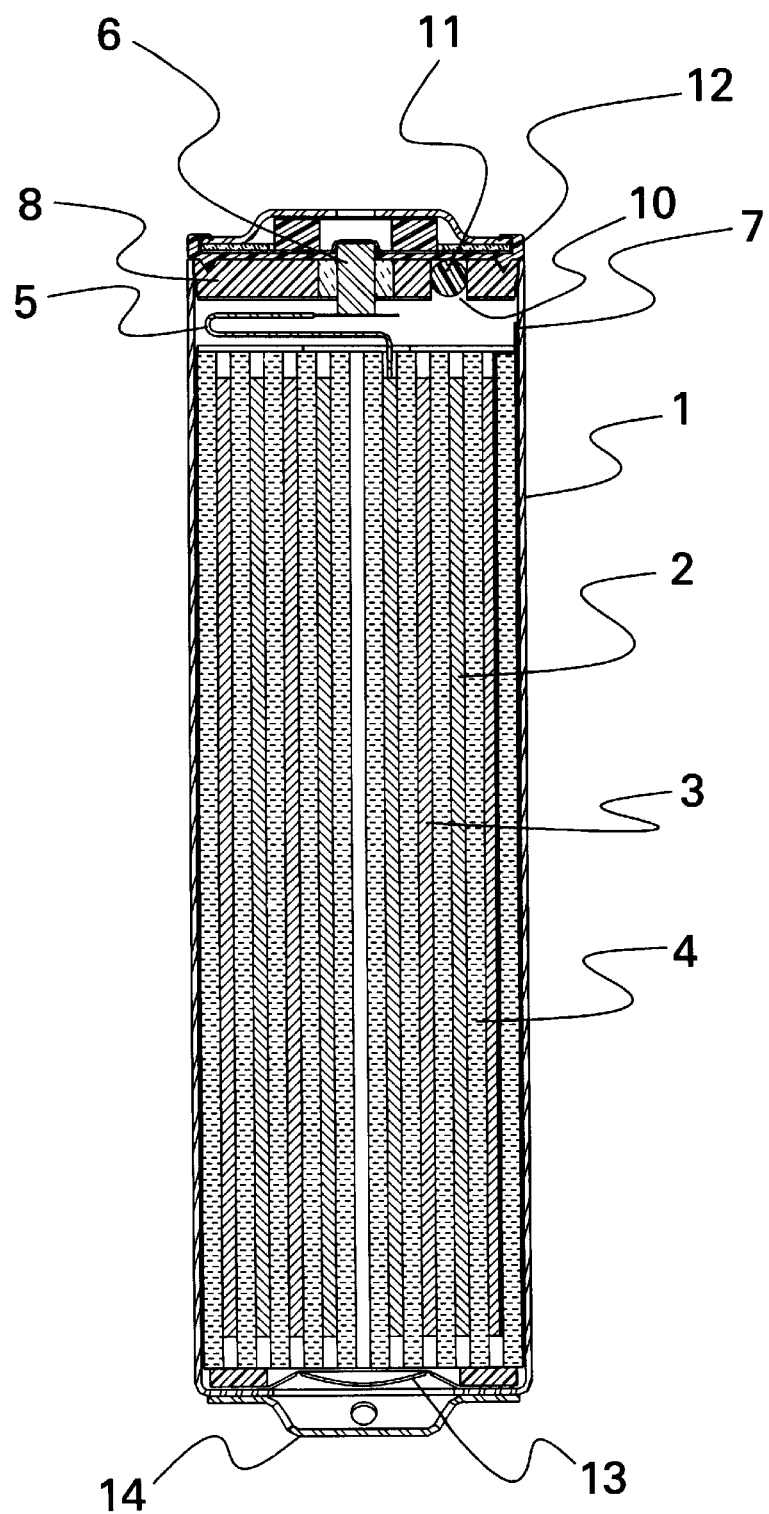
FIG. 2 illustrates the cross-section of the typical cell incorporating a current limiting header assembly of the present invention.

FIG. 2 illustrates the cross-section of one embodiment of a battery incorporating a current limiting protection header assembly of the present invention. The battery comprises a stainless steel, aluminum, alloy or other metallic can or casing, 1, in which is contained a battery stack which comprises a positive cathode layer, 2, and a negative anode layer, 3, separated by a separator insulation layer, 4, which are wound together to form the battery stack. A tab, 5, connected to or integral with the positive cathode layer, 2, is secured to a metal pin terminal, 6, for current feedthrough. Another tab, 7, is connected to or integral with the negative anode layer, 3, and is secured to the can or casing 1.

The upper end of the battery is typically formed by a lid assembly, 8, which is welded to the can or casing, 1, by an inert gas, such as for example, Tungsten Inert Gas (TIG), or laser beam weld. The lid assembly, 8, incorporates a metal pin terminal, 6, for current feedthrough, which is attached to, and is electrically isolated from, the lid assembly by a glass-to-metal or plastic-to-metal seal, 9, comprising an insulating sealing glass or plastic. The lid assembly, 8, also incorporates an access port, 10, to permit filling of the cell with electrolyte, and which can be subsequently sealed with a press fit ball seal, 11. The current limiting header assembly, 12, is attached to the top of the battery by a laser weld to the metal pin terminal, 6.

The bottom end of the battery is typically formed by a reverse frustrum diaphragm vent, 13, negative contact end cap, 14, and the casing, 1. The reverse frustrum diaphragm vent, 13, is typically welded to the can or casing, 1, by inert gas, such as TIG, or laser beam welding, and the negative contact end cap, 14, is typically welded to the can or casing, 1, using a resistance welder. The design of the bottom end of the battery may vary widely as is known in the art, such as for example, by utilizing other types of vents or having no vent, and also by utilizing a variety of different end caps.

Figure 3A:
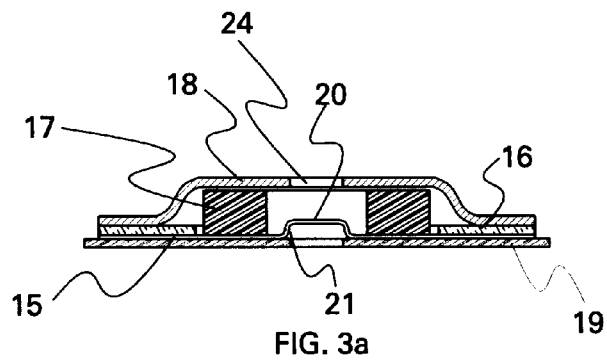
FIGS. 3(a), 3(b), 3(c) and 3(d) show cross-sectional views of current limiting header assemblies of the present invention.
Figure 3B:
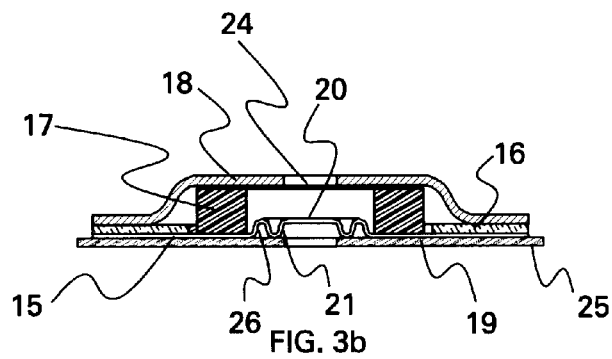

FIGS. 3(a), 3(b), 3(c), and 3(d) illustrate cross-sections of several embodiments of the current limiting header assembly of the present invention. FIG. 4 illustrates an exploded view of an embodiment of the current limiting header assembly of the present invention. In these embodiments, the header assembly comprises some or all of the following: a support plate, 15, a PTC plate, 16, a first insulating plate, 17, an end cap, 18, and a second insulating plate, 19.

The support plate, 15, is a substantially flat electrically conductive support plate having a perimeter, a first face, and a second opposite face, said support plate having on said first face, a raised dimple, 20, having a raised dimple height and a raised dimple outer diameter, and on said second opposite face a sunken dimple, having a sunken dimple depth, a sunken dimple inner diameter, and a sunken dimple inside surface, 21. The diameter of the raised dimple outer diameter is measured across the outer perimeter of the raised area, including the outermost raised area if there are more than one raised areas, as for example in a convoluted spring or bellow feature as illustrated in FIGS. 3(b) and 3(d). The raised area is taken as any area on the first face of the support plate which is raised above the substantially flat surface on the first face of the support plate. The diameter of the sunken dimple inner diameter is measured across the outer perimeter of the sunken area, but including only the central sunken area if there are more than one sunken area, as for example in a convoluted spring or bellows feature as illustrated in FIGS. 3(b) or 3(d). The sunken area is taken as any area on the second opposite face of the support plate which is sunken below the substantially flat surface on the second opposite face of the support plate.

The support plate is selected to have desired solderability and weldability properties. Preferably the support plate is both wettable by Sn63 solder and other metal solders and by various metal-filled conductive polymer based bonding materials, and also weldable to a variety of nickel and stainless steel alloys used in electrical feedthroughs. The support plate typically comprises pure nickel, an alloy of high nickel content, or a steel alloy which is nickel plated, which allows wetting of reflow solder pastes and other electrically conductive bonding materials. A particularly preferred choice of materials is a pure nickel material since this is easily formable by stamping, wettable by tin-based and other solders, and weldable to a variety of stainless steel and nickel alloys.

The PTC plate, 16, is a thermally activated current limiting PTC device which provides current limiting properties under overcurrent and other overheating conditions and typically is resettable for continued use of the battery after the abusive conditions are removed allowing the cell to return to normal operating conditions. The PTC plate is a substantially flat apertured PTC plate having a perimeter and positioned above the support plate, and on the same side of the support plate as the raised dimple, 20, the PTC plate being in electrical contact with the support plate, 15. The PTC plate may be bonded to the support plate, 15, via a first electrically conductive bonding material. In one embodiment, the PTC plate has an aperture, 22, which is larger than the raised dimple outer diameter and which is large enough to accommodate the raised dimple, 20, which aperture is aligned with the raised dimple, which raised dimple protrudes into or through the aperture, 22, of the PTC plate. In one embodiment, the PTC plate has an aperture, 22, which is larger than the perimeter of the first insulating plate, 17, and which is large enough to accommodate the first insulating plate, which first insulating plate is positioned within the aperture, 22, of the PTC plate.

The PTC plate, 16, is selected to have the desired current limiting properties under overcurrent and other overheating conditions for a specific cell chemistry application. PTC plates are available, for example, from Raychem Corporation, Menlo Park, Calif. under the tradename POLYSWITCH material. In one embodiment, the PTC plate has a nickel coating on both sides to allow electrical contact and to allow wetting of the PTC plate with reflow paste solder during the sealing process.

The first insulating plate, 17, is a substantially flat apertured electrically insulating plate positioned above the support plate, 15, and on the same side of the support plate as the raised dimple, 20, the first insulating plate having an aperture, 23, which is larger than the raised dimple outer diameter and which is large enough to accommodate the raised dimple, which aperture is aligned with the raised dimple, which raised dimple protrudes into the aperture, 23, of the first insulating plate, the insulating plate having a height which extends beyond the top of the raised dimple, the first insulating plate having a perimeter which does not extend beyond the perimeter of the support plate.

Suitable materials for the first insulating plate include, but are not limited to, tetrafluoroethylene polymers (thermoplastic polymers available under the trademark of TEFLON™ from DuPont, Wilmington, Del.), which offer additional protection against laser beam damage to the cell if the beam is misaligned during the laser beam weld process. Also, the tetrafluoroethylene polymers have a very high melting temperature of over 300° C., which allows the first insulating plate to maintain its geometry and/or dimensional stability during any thermal cycling of the cell or during different processes such as welding of the cell. The first insulating plate is typically fabricated from polytetrafluoroethylene polymer compositions which absorb the wavelengths of light from most types of laser beams used for welding cells.

The first insulating plate, 17, helps to prevent damage to nearby materials during welding with laser beams and also helps to prevent electrical shorts and bypass of the PTC plate, 16, if the end cap, 18, is mechanically deformed. The height and the inner diameter of the aperture, 23, of the first insulating plate are chosen to provide safety if the end cap is crushed or if the laser beam is misaligned during welding of the header assembly, 12, to the metal pin terminal feedthrough, 6. The first insulating plate also helps to block the laser beam if it is misaligned, thereby helping to prevent any damage to internal parts of the cell by the laser beam and to avoid potential unsafe conditions from the interaction of the laser beam with reactive and volatile components of the cell.

The end cap, 18, is an electrically conductive end cap having a perimeter and positioned above the first insulating plate, 17, and above the PTC plate, 16, the end cap being in electrical contact with the PTC plate, the first insulating plate, 17, interposed between the end cap, 18, and said support plate, 15. The end cap may be bonded to the PTC plate via a second electrically conductive bonding material.

The end cap is utilized to make electrical contact with tabs or other electrical connection sites of the cell as well as to provide mechanical protection to the header assembly and other internal parts of the cell. The end cap also preferably has an aperture, 24, which serves as a laser beam access hole to facilitate attachment of the header assembly, 12, to the cell. The end cap typically comprises a stainless steel alloy which is nickel plated to allow wetting of the bottom flange surface during the sealing process. The size of the aperture, 24, should be approximately 20% larger than the laser beam diameter to reduce or avoid interference with the weld and to reduce or avoid the formation of deposits on the external surface of the end cap.

The second insulating plate, 19, is a substantially flat apertured electrically insulating plate positioned below the support plate, 15, and on the same side of the support plate as the sunken dimple, the second insulating plate having an aperture which is equal to or smaller than the sunken dimple inner diameter and which is aligned with the sunken dimple, the second insulating plate having a perimeter which extends beyond the perimeter of the support plate. In one embodiment the second insulating plate may have an aperture equal to or larger than the diameter of the metal pin terminal feedthrough, 6. Preferably, the aperture of the second insulating plate is chosen so that the second insulating plate fits tightly over the metal pin terminal feedthrough, 6. In one embodiment, the second insulating plate may further comprise at its perimeter a raised lip, 25, which raised lip is in contact with the perimeters of the support plate, 15, the PTC plate, 16, and the end cap, 18, the raised lip forming the outer perimeter of the header assembly, 12. Typically, the second insulating plate may be in the general form of a plastic support cup. The second insulating plate may further comprise a protrusion on the face opposite the face of the second insulating plate which is in contact with the support plate. The second insulating plate is placed between the conductive metallic parts of the header assembly, 12, and the cell can or casing, 1, in order to prevent electrical shorting of these conductive metallic parts to the cell can or casing.

The current limiting header assembly, 12, is attached to the cell primarily by a laser beam weld to the metal pin terminal feedthrough, 6. The raised dimple, 20, of the support plate, 15, permits the easy and accurate alignment of the header assembly, 12, over the metal pin terminal feedthrough, 6. The metal pin terminal feedthrough, 6, is then laser welded to the bottom surface of the raised dimple, 20, by directing a short duration laser pulse through the aperture, 24, in the end cap, 18.

The arrangement and design of the support plate, 15, allows electrical and mechanical connection to be made between the cell's metal pin terminal feedthrough, 6, and the PTC plate, 16. The header assembly, 12, as an integrated part is capable of being manufactured in an off-line operation and then assembled as one unit securely into the cell. The raised dimple, 20, also helps to reduce the space requirements for the header assembly. The height of the raised dimple, 20, is chosen so as to cause the contact surfaces between the support plate, 15, and the metal pin terminal feedthrough, 6, to attain the desirable compressive force prior to laser beam welding, with allowance for some variations of the height of the metal pin terminal feedthrough. Additionally, the dimpled design of the support plate, 15, allows for slight misalignment of the top surface of the metal pin terminal feedthrough, 6, relative to the raised dimple, 20, while maintaining sufficient close contact between the metal surfaces during the welding process. Preferably, the inside surface of the sunken dimple (i.e., the underside of the raised dimple, 20) is a convex surface, which helps to accommodate misalignment of the metal pin terminal feedthrough, 6, and support plate, 15, and allows a preloaded compressed condition for positive contact during laser beam welding by acting as a deformable spring surface, and collapses upon welding to form a continuous bond. In one embodiment, the raised dimple, 20, is a portion of a convoluted spring or bellows feature, 26, which helps to provide greater flexibility and contact to the raised dimple during and after bonding.

The PTC plate, 16, may be bonded to the support plate, 15, via a first electrically conductive bonding material. The end cap, 18, if present, may be bonded to the PTC plate, 16, via a second electrically conductive bonding material. In one embodiment, the upper flat surface of the support plate, 15, both upper and lower surfaces of the PTC plate, 16, and the bottom flange surface of the end cap, 18, are bonded via an electrically conductive bonding material. Examples of suitable conductive bonding materials, include but are not limited to, metal solders, conductive polymer compositions and mixtures thereof. Preferred electrically conductive bonding materials, include but are not limited to, tin-based solders, conductive nickel-filled epoxy polymers, and conductive silver-filled epoxy polymers. Typically, these components of the header assembly are bonded by a reflow soldering process, such as, for example, using a Sn63 or equivalent solder paste, with flux applied to those surfaces after a safety insulator, 17, if present, is placed around the raised dimple, 20, of the support plate, 15.

During operation of the cell illustrated in FIG. 2, current flows from the positive cathode layer, 2, through the tab, 5, through the metal pin terminal feedthrough, 6, through the support plate, 15, through the PTC plate, 16, and through the contact end cap, 18. In another embodiment of the present invention, the current may flow in the reverse direction. In one embodiment of the present invention, the current flow may be from the negative anode layer and subsequently through the current limiting header assembly of the present invention and the through a contact end cap of an appropriate design, including that shown in for contact end cap, 18. There may be changes in the design of the end caps, shapes of the raised dimple, and other components of the current limiting header assembly of this invention to better accommodate connection to the negative anode and for current flows in the reverse direction. The header assembly is designed to stop or limit current flow exceeding the set value of the PTC device (i.e., PTC plate), for example, a 5 Ampere limit. The actual value may be easily altered by changing the thickness or surface area of the PTC plate. The upper value for the current range is determined by the maximum current allowed for a given electrochemistry used in the cell. When the current is reduced to a safe value or the cause of the short circuit is removed, the PTC device (i.e., PTC plate) typically will reset.

To limit possible side loads from damaging the metal pin terminal feedthrough, 6, and the glass-to-metal , plastic-to-metal, or similar seal, 9, and to transmit any direct end loads to the can or casing, 1, instead of the metal pin terminal feedthrough, 6, two features of the header assembly are used to redirect impact loading, such as that, for example, caused by dropping of the cell to a hard surface. First, the underside of the second insulating plate, 19, may have a protrusion that transfers side loading directly to the can or casing, 1, through the lid assembly, 8. Thus, the second insulating plate, 19, acts as a locating device and a shock and impact force director which transfers the load of the impact or shock forces to the lid assembly, 8, and the body or casing, 1, of the cell instead of to the metal pin terminal feedthrough, 6, of the feedthrough terminal. Second, the end cap, 18, directs the loading forces to the can or casing, 1, through the lid assembly, 8, by compressing the perimeter of the header assembly, 12, and the second insulating plate, 19. The centers of the support plate, 15, and the PTC plate, 16, can move relative to their perimeters by means of flexing, thereby limiting the loading transferred to the metal pin terminal feedthrough, 6. Thus, the flexible, relatively thin plate structures of the header assembly have particular utility in allowing for some vertical movement without transferring excessive forces to the metal pin terminal feedthrough, 6.

While the current limiting header assemblies of the present invention may be utilized on a variety of electric current producing cells, lithium cells in a cylindrical configuration are described in greatest detail herein. Such cells are merely illustrative and examples of other cells that may be used include, but are not limited to, carbon-zinc dry cells, "alkaline" cells, nickel-cadmium cells, and cells with other chemistries. The configuration and shapes of the cells that may be used with the current limiting header assembly of this invention may also vary widely, such as for example, utilization in cells of a prismatic shape having a substantially rectangular cross section with opposed flat faces. The terminal design of each type of battery may vary widely, such as for example, comprising metal leads or tabs of various shapes for connecting the anode or cathode to the current limiting header assembly of the present invention. Preferably, the terminal design of the battery comprises a design with a metal pin terminal feedthrough with a surrounding electrically insulating bonding material (e.g., glass-to-metal , plastic-to-metal, or similar seal). The design of the header assembly of the invention allows for suitable adaptation of the design depending upon the specific type and configuration of the metal pin terminal feedthrough.

One advantage of the current limiting header assembly of the present invention over the conventional crimped seal designs is that it requires substantially less space, particularly in its height, in the cell. The reduction in height is attributable to the relocation of the stacked height found in a crimped design to a space under the end cap. This space would normally be required anyway to obtain the end cap protrusion height according to national and international size specification requirements. By reducing the space required for the current limiting device and by not utilizing a crimped seal design, a battery containing the current limiting header assembly of this invention can contain more energy-producing materials, yielding a battery having an increase in power density over a comparable cell utilizing conventional crimp seal and vent designs.

Attachment of the current limiting header assembly to the terminal while providing good mechanical strength is yet another advantage of the design. The ability to make the current limiting header assembly using an off-line reflow solder or other assembly process allows the header assembly to be placed into the cell as a single piece with the insulators already incorporated into the header assembly. Previously, most designs would require multiple parts to be stacked into position and then attached by crimping or soldering. Simplifying the attachment process by including a laser beam access hole, 24, in the end cap, 18, and utilizing a compatible weld material for the support plate, 15, renders attachment to a metal pin terminal feedthrough, 6, a repeatable and simplified process which is readily adapted to automation. A single short duration laser pulse of a specific intensity and diameter is sufficient to weld the header assembly to the cell. Little or no significant heating of the header assembly and metal pin terminal feedthrough , 6, occurs because of the short duration of the laser pulse and the mass of the parts. Therefore, there is little risk of damaging a glass-to-metal or plastic-to-metal seal as may occur with, for example, resistance welding techniques.

Thus, the current limiting header assemblies of the present invention have particular application in batteries or cells which do not have a crimped sealing design yet must be provided with a reliable current limiting protection device which has good durability to function throughout the entire life of the battery or cell. Therefore, the current limiting header assemblies of the present invention are particularly characterized by their combination of relatively inexpensive costs of manufacturing, reduced space requirements in the cell, and performance reliability.

EXAMPLES

Several embodiments of the present invention are described in the following examples, which are offered by way of illustration and not by way of limitation.

Example 1

Composite cathodes with the composition (dry weight basis) of 50% sulfur (Aldrich Chemical Company, Madison, Wis.), 15% conductive carbon pigment (Shawingan Acetylene Black or SAB-50 available from Chevron Corporation, Baytown, Tex.), 25% vanadium oxide aerogel, 6% polyethylene oxide (PEO, molecular weight 5,000,000, available from Polysciences Inc., Warrington, Pa.), and 4% epoxy binder (DER 331, available from Dow Chemical Company, Midland, Mich.) were prepared by a slurry method in a 9:1 by volume mixed solvent of methyl acetate/n-propanol. Cathodes were coated using a gap blade coater on both sides of a 18 $\mu$m conductive carbon coated aluminum foil (Product No. 60303, Rexam Graphics, South Hadley, Mass.) as a current collector. The cathodes were air dried before a final drying in vacuum at 60° C. for 1 hour.

An electrode jelly roll was wound with the above cathode, 4 mil lithium foil (available from Cyprus Foote Mineral Company, Kings Mountain, N.C.) and a 25 $\mu$m E25 SETELA separator (a tradename for a polyolefin separator available from Tonen Chemical Corporation, Tokyo, Japan, and also available from Mobil Chemical Company, Films Division, Pittsford, N.Y.) in a dry room. The jelly roll was inserted into stainless steel AA can with a coined vent, and the can sealed with a lid with a glass metal seal around the center metal pin terminal feedthrough. The lid was sealed to the can with TIG weld. The cell was filled by vacuum back fill with a non aqueous electrolyte solution of 1.0 M LiSO$_3$CF$_3$ (lithium triflate, available from 3M Corporation, St. Paul, Minn.) in a 1:1 by volume solvent mix of tetraglyme and 1,3-dioxolane.

Figure 3C:
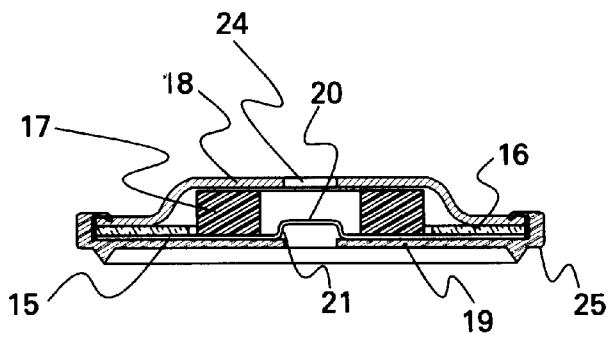
Figure 3D:
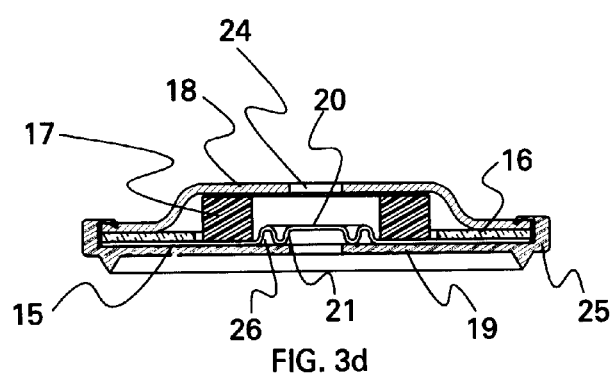
Figure 4:
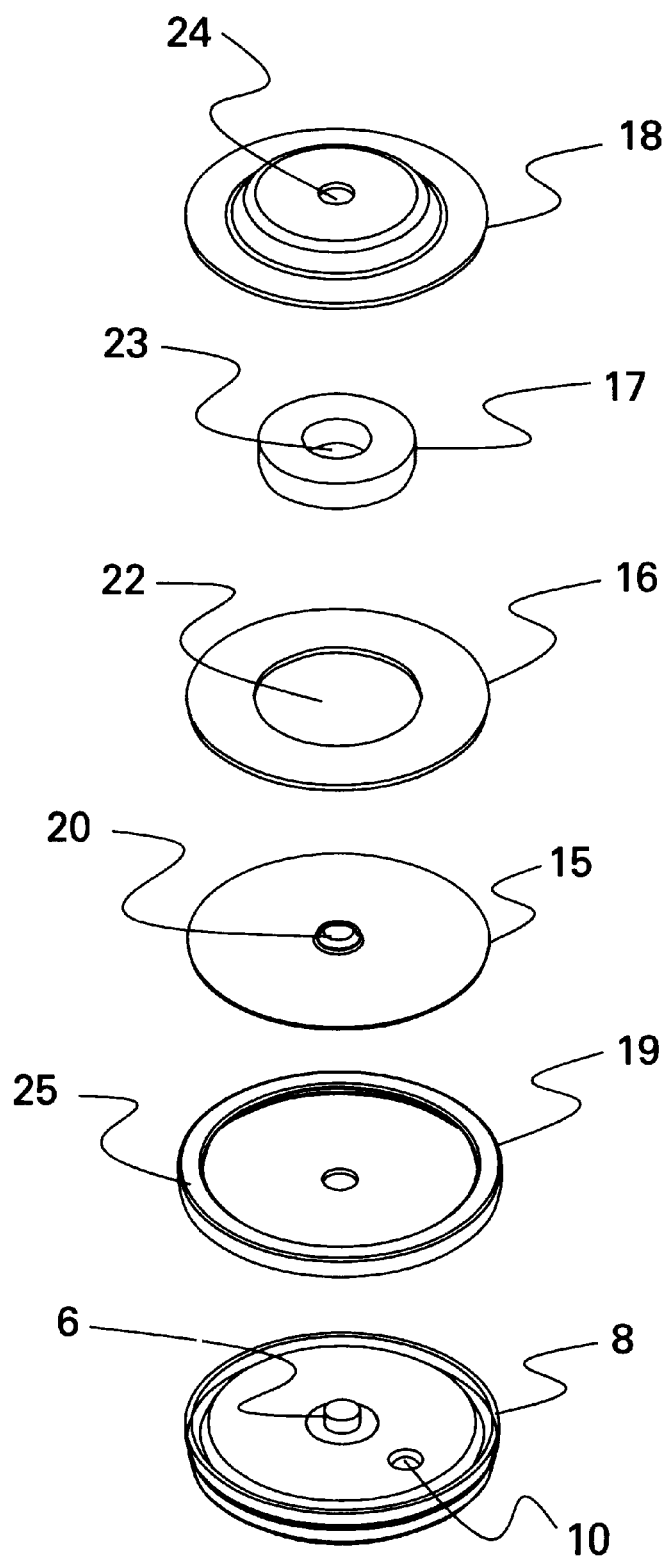
FIG. 4 shows an exploded perspective view of one embodiment of an insulated current limiting protection header and lid assembly of the present invention.

A PTC header assembly as shown in FIG. 3(c) was attached to the center pin of the glass metal seal by spot laser pulse welding. The header assembly was constructed of a mild steel with nickel plating end cap and support plate, a 90° C. nickel plated POLYSWITCH PTC plate (available from Raychem Corporation, Menlo Park, Calif.), and TEFLON first and second insulating plates. Control cells were assembled without a PTC header assembly.

Cells were subjected to an short circuit abuse test by connecting the positive and negative terminals of the cell with a copper wire as described in UL 1642 by Underwriters Laboratory Inc., Northbrook, Ill., Apr. 26, 1995. Thermocouples were attached to the bottom of the cell in the vent area and on the cell case to monitor cell temperature during the test. During the test the cell current was monitored, and cell discharged until the cell either failed the test by fire, explosion or venting, or until the cell was completely discharged and returned to near ambient temperature. Cells were either tested uncycled or after cycling for 5 repeat discharge and charge cycles at a discharge current of 275 mA and a taper charge at 250 mA until a voltage of 3.0 V or 120% of the last discharge capacity. Table 1 summarizes the test results for uncycled and cycled cells. A cell was determined to have failed the safety test if either the case temperature exceeded 95° C., or if the cell vented.

TABLE 1

Short Circuit Test Results

| | Uncycled with PTC | | Uncycled with No PTC | | Cycled with PTC | | Cycled with No PTC | |
|---|---|---|---|---|---|---|---|---|
| | Pass | Fail | Pass | Fail | Pass | Fail | Pass | Fail |
| Number of cells | 1 | 0 | 0 | 1 | 5 | 0 | 0 | 5 |

For a typical uncycled cell the cell current jumped to about 8.5 A for about 3 seconds after which time period, the PTC device activated and reduced the current to about 0.5 A after 2.5 minutes. The cell temperature was limited to a maximum of about 45 to 70° C. No venting or fire was observed with this cell.

In a comparative experiment, an identical uncycled cell with a glass-to-metal seal, except that the above header assembly with PTC device was not included, was placed on the short circuit abuse test. The cell current jumped to 8.5 A and then slowly lowered before jumping up a second time to a value of about 6 A. The cell temperature rapidly rose to a level of 95 to 100° C. although no venting or fire of the cell was observed.

Example 2

A composite cathode with the composition (dry weight basis) of 60% sulfur, 10% conductive carbon pigment (PRINTEX XE-2, a tradename for a carbon pigment available from Degussa Corporation, Akron, Ohio), 20% non-activated carbon nanofibers (PYROGRAF-III, a tradename for carbon nanofibers available from Applied Sciences, Inc., Cedarville, Ohio), 5% SiO$_2$ (AEROSIL 380, a tradename for silica available from Degussa Corporation, Akron, Ohio) and 5% polytetrafluoroethylene binder (TEFLON, a tradename for PTFE polymer available from DuPont Corporation, Wilmington, Del.) was prepared by a standard paste method using isopropanol as the dispersing medium, and extruded onto a 175 $\mu$m aluminum EXMET (a tradename for a mesh current collector available from EXMET Corporation, Naugatuck, Conn.) current collector by the Rondo extrusion technique. Cathodes were dried for 1 hour at 60° C. in vacuum.

A wound AA cell with the above cathode was assembled and filled with a nonaqueous liquid electrolyte solution of 1.0 M LiN(CF$_3$SO$_2$)$_2$ (lithium imide, available from 3M Corporation, St. Paul, Minn.) in a 50:20:20:10 by volume solution of 1,3-dioxolane:2-methoxyethyl ether:dimethoxyethane:sulfolane, as described in Example 1.

A PTC header was assembly to the test cells, as described in Example 1. The PTC had a reduced response time of 30 seconds to 1 minute to reduce the current to 0.5 A compared to the PTC header assembly used in Example 1 which required 1 minute or more to reduce the current to 0.5 A.

Cells were subjected to the short circuit test described in Example 1 after cycling for 5 discharge and charge cycles at a discharge current of 275 mA and a charge at 100 mA until a voltage of 3.0 V or 120% of the last discharge capacity. Table 2 summarizes the test results.

TABLE 2

Short Circuit Test Results

|  | Cycled with PTC | | Cycled with No PTC | |
| --- | --- | --- | --- | --- |
|  | Pass | Fail | Pass | Fail |
| Number of Cells | 4 | 0 | 0 | 5 |

The cell case temperature as limited to a maximum of the range 60 to 70° C., and no venting or fire was observed with the cells with the PTC header assembly. The five cells tested without a PTC header failed the safety test as the case temperature exceeded 95° C., with three of these cells also venting without fire.

While the invention has been described in detail and with reference to specific and general embodiments thereof, it will be apparent to one skilled in the art that various changes and modifications can be made therein without departing from the spirit and scope of the invention, as described by the appended claims.

We claim:

1. A thermally activated current limiting assembly comprising:
   (i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface; and,
   (ii) a substantially flat apertured PTC plate positioned above said support plate, and on the same side of said support plate as said raised dimple, said PTC plate being in electrical contact with said support plate, said PTC plate having an aperture which is larger than said raised dimple outer diameter and which is large enough to accommodate said raised dimple, which aperture is aligned with said raised dimple, which raised dimple protrudes into or through said aperture.

2. The assembly of claim 1, wherein said inside surface of said sunken dimple is a convex surface.

3. The assembly of claim 1, wherein said raised dimple is a portion of a convoluted spring or bellows feature.

4. The assembly of claim 1, wherein said PTC plate is bonded to said support plate via a first electrically conductive bonding material.

5. The assembly of claim 4, wherein said first electrically conductive bonding material is selected from the group consisting of: metal solders, conductive polymer compositions, and mixtures thereof.

6. The assembly of claim 4, wherein said first electrically conductive bonding material is selected from the group consisting of: tin-based solders, conductive nickel-filled epoxy polymers, and conductive silver-filled epoxy polymers.

7. A thermally activated current limiting header assembly for use in a battery, said assembly comprising:
   (i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;
   (ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate; and,
   (iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate.

8. The assembly of claim 7, wherein said inside surface of said sunken dimple is a convex surface.

9. The assembly of claim 7, wherein said raised dimple is a portion of a convoluted spring or bellows feature.

10. The assembly of claim 7, wherein said PTC plate is bonded to said support plate via a first electrically conductive bonding material.

11. The assembly of claim 10, wherein said first electrically conductive bonding material is selected from the group consisting of: metal solders, conductive polymer compositions, and mixtures thereof.

12. The assembly of claim 10, wherein said first electrically conductive bonding material is selected from the group consisting of: tin-based solders, conductive nickel-filled epoxy polymers, and conductive silver-filled epoxy polymers.

13. A thermally activated current limiting header assembly for use in a battery, said assembly comprising:
   (i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;
   (ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate;
   (iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate; and, (iv) an electrically conductive end cap having a perimeter and positioned above said first insulating plate and above said PTC plate, said end cap being in electrical contact with said PTC plate, said first insulating plate interposed between said end cap and said support plate.

14. The assembly of claim 13, wherein said inside surface of said sunken dimple is a convex surface.

15. The assembly of claim 13, wherein said raised dimple is a portion of a convoluted spring or bellows feature.

16. The assembly of claim 13, wherein said PTC plate is bonded to said support plate via a first electrically conductive bonding material.

17. The assembly of claim 16, wherein said first electrically conductive bonding material is selected from the group consisting of: metal solders, conductive polymer compositions, and mixtures thereof.

18. The assembly of claim 16, wherein said first electrically conductive bonding material is selected from the group consisting of: tin-based solders, conductive nickel-filled epoxy polymers, and conductive silver-filled epoxy polymers.

19. The assembly of claim 13, wherein said end cap is bonded to said PTC plate via a second electrically conductive bonding material.

20. The assembly of claim 19, wherein said second electrically conductive bonding material is selected from the group consisting of: metal solders, conductive polymer compositions, and mixtures thereof.

21. The assembly of claim 19, wherein said second electrically conductive bonding material is selected from the group consisting of: tin-based solders, conductive nickel-filled epoxy polymers, and conductive silver-filled epoxy polymers.

22. The assembly of claim 13, wherein said end cap has an aperture.

23. A thermally activated current limiting header assembly for use in a battery, said assembly comprising:

(i) a substantially flat electrically conductive support plate having a perimeter, a first face, and a second opposite face, said support plate having on said first face, a raised dimple having a raised dimple height and a raised dimple outer diameter, and on said second opposite face a sunken dimple, having a sunken dimple depth, a sunken dimple inner diameter, and a sunken dimple inside surface;

(ii) a first substantially flat apertured electrically insulating plate positioned above said support plate, and on the same side of said support plate as said raised dimple, said first insulating plate having an aperture which is larger than said raised dimple outer diameter and which is large enough to accommodate said raised dimple, which aperture is aligned with said raised dimple, which raised dimple protrudes into said aperture of said first insulating plate, said insulating plate having a height which extends beyond the top of said raised dimple, said first insulating plate having a perimeter which does not extend beyond the perimeter of said support plate;

(iii) a substantially flat apertured PTC plate having a perimeter and positioned above said support plate, and on the same side of said support plate as said raised dimple, said PTC plate being in electrical contact with said support plate, said PTC plate having an aperture which is larger than the perimeter of said first insulating plate and which is large enough to accommodate said first insulating plate, which first insulating plate is positioned within said aperture of said PTC plate;

(iv) an electrically conductive end cap having a perimeter and positioned above said first insulating plate and above said PTC plate, said end cap being in electrical contact with said PTC plate, said first insulating plate interposed between said end cap and said support plate; and, (v) a second substantially flat apertured electrically insulating plate positioned below said support plate, and on the same side of said support plate as said sunken dimple, said second insulating plate having an aperture which is equal to or smaller than said sunken dimple inner diameter and which is aligned with said sunken dimple, said second insulating plate having a perimeter which extends beyond the perimeter of said support plate.

24. The assembly of claim 23, wherein said second insulating plate has at its perimeter a raised lip, which raised lip is in contact with said perimeters of said support plate, said PTC plate, and said end cap, said raised lip forming the outer perimeter of said assembly.

25. The assembly of claim 23, wherein said inside surface of said sunken dimple is a convex surface.

26. The assembly of claim 23, wherein said raised dimple is a portion of a convoluted spring or bellows feature.

27. The assembly of claim 23, wherein said PTC plate is bonded to said support plate via a first electrically conductive bonding material.

28. The assembly of claim 27, wherein said first electrically conductive bonding material is selected from the group consisting of: metal solders, conductive polymer compositions, and mixtures thereof.

29. The assembly of claim 27, wherein said first electrically conductive bonding material is selected from the group consisting of: tin-based solders, conductive nickel-filled epoxy polymers, and conductive silver-filled epoxy polymers.

30. The assembly of claim 23, wherein said end cap is bonded to said PTC plate via a second electrically conductive bonding material.

31. The assembly of claim 30, wherein said second electrically conductive bonding material is selected from the group consisting of: metal solders, conductive polymer compositions, and mixtures thereof.

32. The assembly of claim 30, wherein said second electrically conductive bonding material is selected from the group consisting of: tin-based solders, conductive nickel-filled epoxy polymers, and conductive silver-filled epoxy polymers.

33. The assembly of claim 23, wherein said end cap has an aperture.

34. The assembly of claim 23, wherein said second insulating plate further comprises a protrusion on the face opposite the face of said second insulating place which is in contact with said support plate.

35. A battery comprising:

(i) a container;

(ii) an anode material, a cathode material, and an electrolyte material disposed within said container;

(iii) a lid assembly attached to said container, said lid assembly having a metal terminal pin for current feedthrough, said metal terminal pin in electrical contact with said anode material or said cathode material; and, (iv) an assembly according to claim 1 attached to said lid assembly, wherein said metal terminal pin is attached to, and in electrical contact with, the inside surface of said sunken dimple.

36. A battery comprising:

(i) a container;

(ii) an anode material, a cathode material, and an electrolyte material disposed within said container;

(iii) a lid assembly attached to said container, said lid assembly having a metal terminal pin for current feedthrough, said metal terminal pin in electrical contact with said anode material or said cathode material;

(iv) an assembly according to claim 7 attached to said lid assembly, wherein said metal terminal pin is attached to, and in electrical contact with, the inside surface of said sunken dimple.

37. A battery comprising:

(i) a container;

(ii) an anode material, a cathode material, and an electrolyte material disposed within said container;

(iii) a lid assembly attached to said container, said lid assembly having a metal terminal pin for current feedthrough, said metal terminal pin in electrical contact with said anode material or said cathode material; and, (iv) an assembly according to claim 13 attached to said lid assembly, wherein said metal terminal pin is attached to, and in electrical contact with, the inside surface of said sunken dimple.

38. A battery comprising:

(i) a container;

(ii) an anode material, a cathode material, and an electrolyte material disposed within said container;

(iii) a lid assembly attached to said container, said lid assembly having a metal terminal pin for current feedthrough, said metal terminal pin in electrical contact with said anode material or said cathode material; and, (iv) an assembly according to claim 23 attached to said lid assembly, wherein said metal terminal pin is attached to, and in electrical contact with, the inside surface of said sunken dimple.

39. A method of making a battery comprising:

(i) providing a container;

(ii) providing an anode material, a cathode material and an electrolyte material, and disposing said anode material, cathode material and electrolyte material within said container;

(iii) providing a lid assembly and attaching said lid assembly to said container, said lid assembly having a metal terminal pin for current feedthrough, said metal terminal pin in electrical contact with said anode material or said cathode material; and, (iv) providing an assembly according to claim 1 and attaching said assembly to said lid assembly, wherein said metal terminal pin of said lid assembly is attached to, and in electrical contact with, the inside surface of said sunken dimple.

* * * * *